(12) United States Patent
Bae

(10) Patent No.: US 7,243,358 B2
(45) Date of Patent: Jul. 10, 2007

(54) SLIM OPTICAL DISC DRIVE

(75) Inventor: Byoung-Young Bae, Suwon (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 620 days.

(21) Appl. No.: 10/720,336

(22) Filed: Nov. 25, 2003

(65) Prior Publication Data

US 2004/0111733 A1 Jun. 10, 2004

(30) Foreign Application Priority Data

Dec. 5, 2002 (KR) ...................... 10-2002-0076996

(51) Int. Cl.
*G11B 33/12* (2006.01)
*G11B 17/04* (2006.01)
(52) U.S. Cl. ...................... 720/652; 720/653
(58) Field of Classification Search ................ 720/652, 720/653, 601
See application file for complete search history.

(56) References Cited

U.S. PATENT DOCUMENTS

| 5,216,558 | A | * | 6/1993 | Griffith et al. ........... 360/99.06 |
|---|---|---|---|---|
| 6,151,284 | A | * | 11/2000 | Watanabe et al. ........... 720/601 |
| 6,320,835 | B1 | * | 11/2001 | Kamei ......................... 720/653 |
| 6,845,509 | B2 | * | 1/2005 | Hsieh et al. ................. 720/601 |
| 6,910,218 | B2 | * | 6/2005 | Park et al. ................... 720/653 |
| 6,922,836 | B2 | * | 7/2005 | Watanabe .................... 720/601 |
| 2001/0026520 | A1 | * | 10/2001 | Watanabe et al. .......... 369/75.2 |
| 2004/0093609 | A1 | * | 5/2004 | Choi ........................... 720/601 |
| 2004/0205785 | A1 | * | 10/2004 | Takahashi et al. .......... 720/601 |

FOREIGN PATENT DOCUMENTS

JP 2002-21155 1/2000

OTHER PUBLICATIONS

JP 2000-021155 (machine translation 9 pages).*

* cited by examiner

*Primary Examiner*—Brian E. Miller
(74) *Attorney, Agent, or Firm*—Staas & Halsey LLP

(57) ABSTRACT

A slim optical disc drive which includes a tray having a spindle motor to rotate an optical disc and an optical pickup which slides across the optical disc mounted on the tray, a lower case where the tray is slidably installed, and a main control board installed on the lower case to control operation of the optical disc drive. The lower case includes a first frame which supports one side of the tray, a second frame which supports the other side of the tray, and a third frame formed of a plate member narrower than the first frame and the second frame to connect the first frame and the second frame and disposed under the tray and a main control board.

11 Claims, 4 Drawing Sheets

SLIM OPTICAL DISC DRIVE

CROSS-REFERENCE TO RELATED APPLICATIONS

This application claims the benefit of Korean Patent Application No. 2002-76996, filed on Dec. 5, 2003, in the Korean Intellectual Property Office, the disclosure of which is incorporated herein by reference.

BACKGROUND OF THE INVENTION

1. Field of the Invention

The present invention relates to an optical disc drive, and more particularly, to a slim optical disc drive installed in portable terminals such as notebook computers.

2. Description of the Related Art

In general, optical disc drives record or read information with respect to an optical disc such as a CD or DVD. Slim optical disc drives are manufactured to be very thin for use in portable terminals such as notebook computers.

FIG. 1 shows a conventional slim optical disc drive. Referring to FIG. 1, a tray 20 is slidably installed in a lower case 10. The tray 20 includes a spindle motor 30 to rotate an optical disc D and an optical pickup 50 to read or write information by accessing the optical disc D while sliding across the optical disc D. A main control board 60 to control the operation of the optical disc drive is installed in the lower case 10 and connected to the optical pickup 50 and the spindle motor 30 installed on the tray 20 by a flexible printed circuit (FPC) 70. The FPC 70 is flexibly folded or unfolded in a space between the tray 20 and the lower case 10 as the tray 20 slides in and out of the lower case 10. Therefore, the FPC 70 is partially attached to the lower case 10.

To make notebook computers thin, the thickness of the slim optical disc drive included in the notebook computers must be reduced. In the slim optical disc drive shown in FIG. 1, the tray 20 is slidably installed with a minimum interval not to interfere with the lower case 10.

Some major factors which affect the thickness of the slim optical disc drive are the sizes of the optical pickup 50 mounted on the tray 20, a motor 40 to slide the optical pickup 50, and the spindle motor 30. If the sizes of these components are large, the slim optical disc drive is made thick accordingly.

Furthermore, the slim optical disc drive is recently developed to have a recording/reproducing function of a CD-RW and/or a DVD reproduction function, in addition to a CD-ROM reproduction function. To accommodate the above various functions, the optical pickup 50 is made larger. Also, since electrical components having various thicknesses are installed on the main control board 60, the thickness of the slim optical disc drive increases.

SUMMARY OF THE INVENTION

Accordingly it is an aspect of the present invention to provide a slim optical disc drive which is made thin to be installed in portable terminals such as notebook computers.

Additional aspects and/or advantages of the invention will be set forth in part in the description which follows and, in part, will be obvious from the description, or may be learned by practice of the invention.

The foregoing and/or other aspects of the present invention are achieved by providing a slim optical disc drive comprising a tray having a spindle motor to rotate an optical disc and an optical pickup which slides across the optical disc mounted on the tray, a lower case where the tray is slidably installed, and a main control board installed on the lower case to control operation of the optical disc drive, wherein the lower case comprises a first frame which supports a first side of the tray, a second frame which supports a second side of the tray, and a third frame formed of a plate member which is narrower than the first frame and the second frame, to connect the first frame and the second frame and disposed under the tray and a main control board.

The main control board is coupled to each of the first frame and the second frame.

The slim optical disc drive further comprises an FPC which is flexibly bent as the tray slides and electrically connects electrical components mounted on the tray, including the optical pickup, and the main control board, wherein a portion of the flexible printed circuit is fixed to the third frame.

BRIEF DESCRIPTION OF THE DRAWINGS

These and/or other aspects and advantages of the invention will become apparent and more readily appreciated from the following description of the embodiments taken in conjunction with the accompanying drawings in which.

DETAILED DESCRIPTION OF THE PREFERRED EMBODIMENTS

Figure 1:
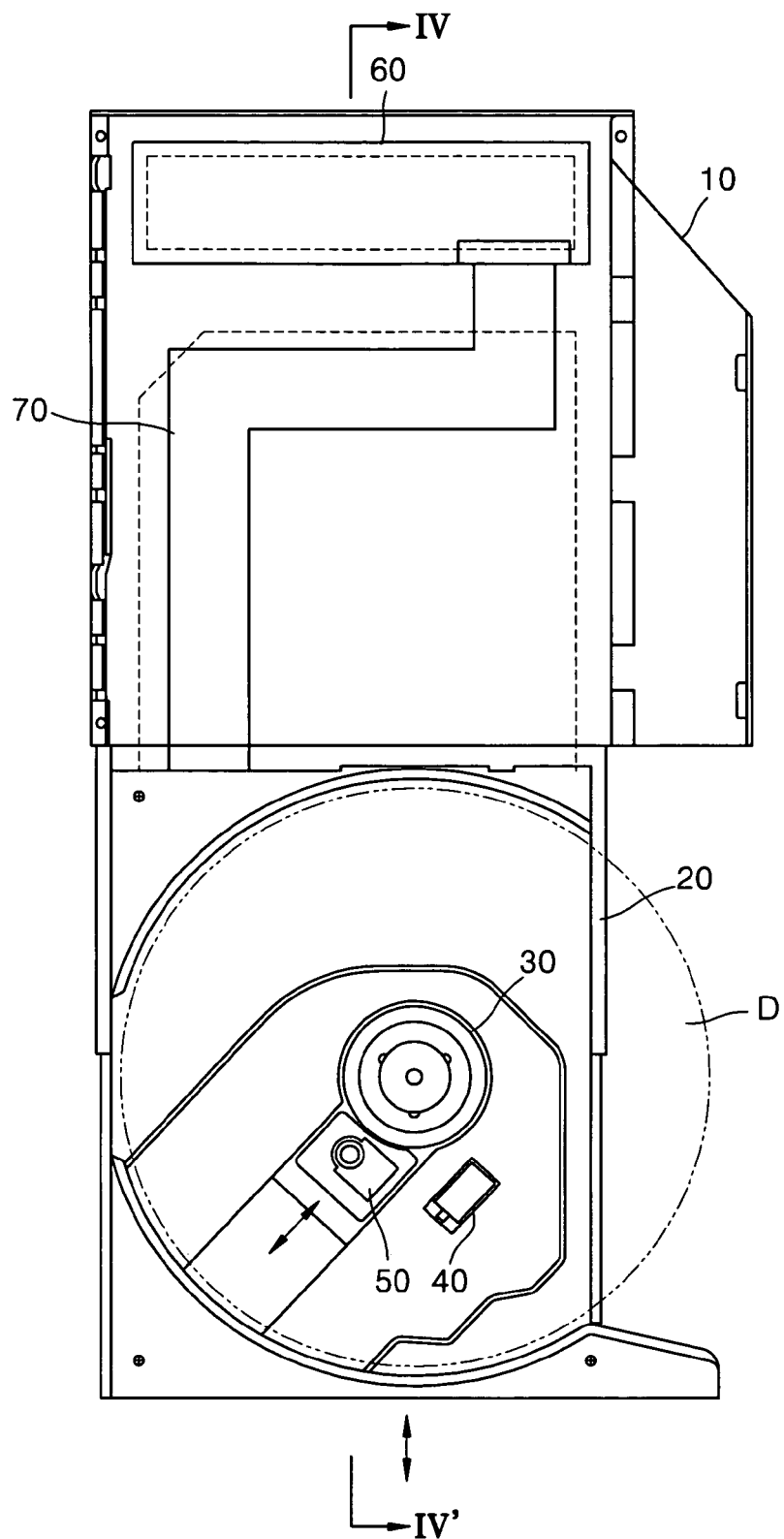
FIG. 1 is a plan view illustrating a conventional slim optical disc drive.

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 2:
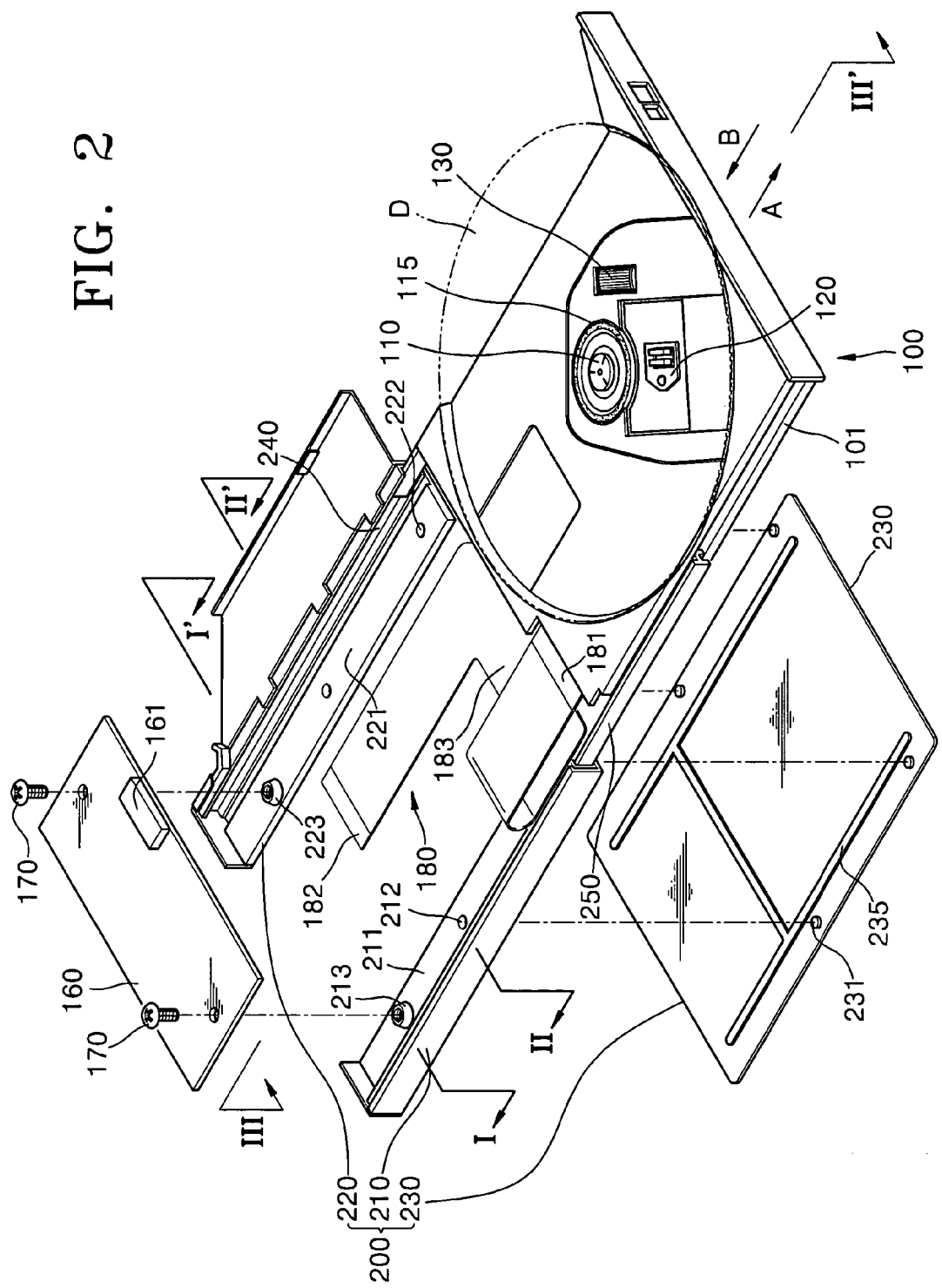
FIG. 2 is a perspective view illustrating a slim optical disc drive according to an embodiment of the present invention.

Referring to FIG. 2, a slim optical disc drive according to an embodiment of the present invention includes a tray 100, a lower case 200 having a first frame 210, a second frame 220, and a third frame 230, and a main control board 160.

Figure 3:
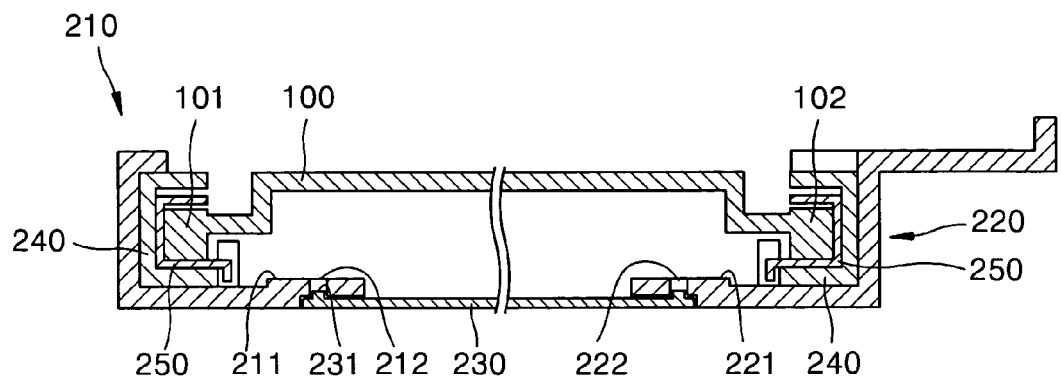
FIG. 3 is a sectional view taken along line II–II' of FIG. 2.

Referring to FIGS. 2–3, a first rail 240 having a U-shaped portion is fixed to each of the first frame 210 and the second frame 220. A second rail 250 having a U-shaped portion is slidably provided in an inner space of each of the first rails 240. Each of edges 101 and 102 of the tray 100 is inserted in an inner space of the second rail 250. When the tray 100 is unloaded, the second rail 250 first slides out in a direction A along the first rail 240 together with the tray 100. When unloading proceeds to a certain degree, the second rail 250 is caught by a stopper (not shown) and does not slide any further. Then, the edges 101 and 102 of the tray 100 continuously slide in the direction A along the second rail 250. When the tray 100 is loaded in a direction B, the operation is performed in the reverse order. The second rail 250 first slides into the first rail 240 together with the tray 100 and then the tray 100 slides into the second rail 250.

The first rail 240 may be manufactured of plastic such as polyacetyl and the second rail 250 may be manufactured by bending a plate member formed of iron or aluminum. The first frame 210 and the second frame 220 may be manufactured by bending a plate member having a thickness of between 0.4 and 0.6 mm in the present embodiment. The first and second frames 210 and 220 use a plate member having the same thickness.

The third frame 230 forms the lower case 200, together with the first frame 210 and the second frame 220, by connecting the first frame 210 and the second frame 220. The third frame 230 uses a plate member which is narrower than the plate member of the first frame 210 and the second frame 220. In an embodiment, the plate member of the third frame 230 having a thickness of 0.2 mm is used.

Accommodation portions 211 and 221 are provided at the edges of the first frame 210 and the second frame 220 and are as thick as the third frame 230 to accommodate the third frame 230. A plurality of protruding portions 231 protruding upward are formed on the third frame 230. The protruding portions 231 are inserted into reference holes 212 and 222 which are formed in the accommodation portions 211 and 221, respectively. The first frame 210 and the second frame 220 are placed on the third frame 230 to face each other such that the protruding portions 231 are inserted in the reference holes 212 and 222. The first frame 210, the second frame 220, and the third frame 230 are connected by spot welding to form the lower case 200. In another embodiment of the present invention, the protruding portions 23 protrude downward on the first frame 210 and the second frame 220 while the reference holes are formed in the third frame 230.

Referring to FIG. 2, the tray 100 comprises a spindle motor 110 to rotate an optical disc D wherein a turntable is installed on a rotation shaft of the spindle motor, an optical pickup 120 to access a recording surface of the optical disc to record or reproduce information while sliding across the optical disc D, and a driving motor 130 to operate the optical pickup.

The main control board 160 which controls the overall operation of the optical disk drive is installed on the lower case 200. The main control board 160 is electrically connected to electrical components installed on the tray 100 (i.e, optical pickup 120, the spindle motor 110, and the driving motor 130), via the FPC 180.

Figure 4:
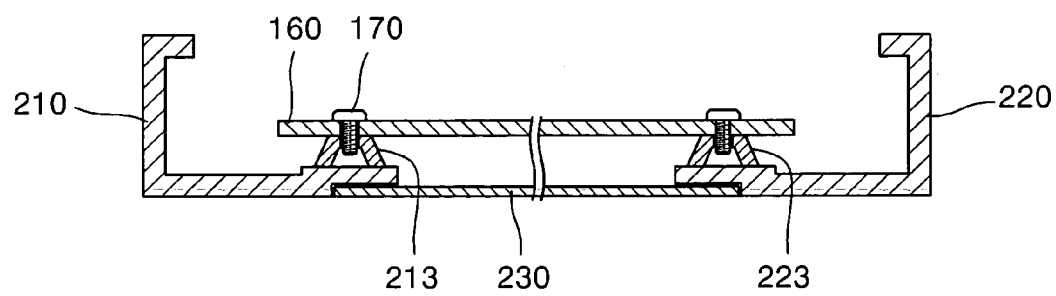
FIG. 4 is a sectional view taken along line I–I' of FIG. 2.

The main control board 160 is connected to each of the first and second frames 210 and 220. Referring to FIG. 4, coupling portions 213 and 223 protruding upward are formed on the first frame 210 and the second frame 220, respectively, and a female screw is formed on the coupling portions 213 and 223 so as to be coupled to a screw 170. The main control board 160 is fixed to the lower case 200 by screwing the screw 170 from the upside after the coupling portions 213 and 223 are accommodated. The main control board 160 includes a plurality of electrical components which are assembled on a printed circuit board (PCB) having a thickness of approximately 1 mm. The main control board 160 is coupled to each of the first and second frames 210 and 220 so as to reinforce a bending strength of the lower case 200.

The FPC 180 is flexibly bent as the tray 100 slides and electrically connects the main control board 160 and the electrical components installed on the tray 100 including the optical pickup 120. The FPC 180 comprises a first connection portion 181 and a second connection portion 182 connected to the tray 100 and the main control board 160, respectively, and is manufactured of a flexibly material. In an embodiment of the present invention, the FPC 180 has a "U" shape and the first and second connection portions 181 and 182 are formed on end portions thereof. The first connection portion 181 is connected to the tray 100 wherein a second PCB (not shown) is connected to spindle motor 110, the optical pickup 120, and the driving motor 130. The first connection portion 181 may be connected to the second PCB. Also, the optical pickup 120 and the driving motor 130 are connected to a third PCB (not shown) which is connected to the spindle motor 110. The first connection portion 181 may be connected to the third PCB. The second connection portion 182 is connected to a connector 161 provided on the main control board 160.

A portion of the FPC 180 must be fixed in order to connect the main control board 160 and the tray 100. Otherwise, when the tray 100 slides, the FPC 180 is not smoothly bent and inserted between the tray 100 and the lower case 200, thus preventing the sliding operation of the tray 100. In some cases, the FPC 180 may be torn. Thus, the FPC 180 is attached to the third frame 230 by using an adhesive (i.e., double-sided tape), from a portion slightly separated from the second connection portion 182 to a bent portion 183 having a "U" shape.

Figure 5:
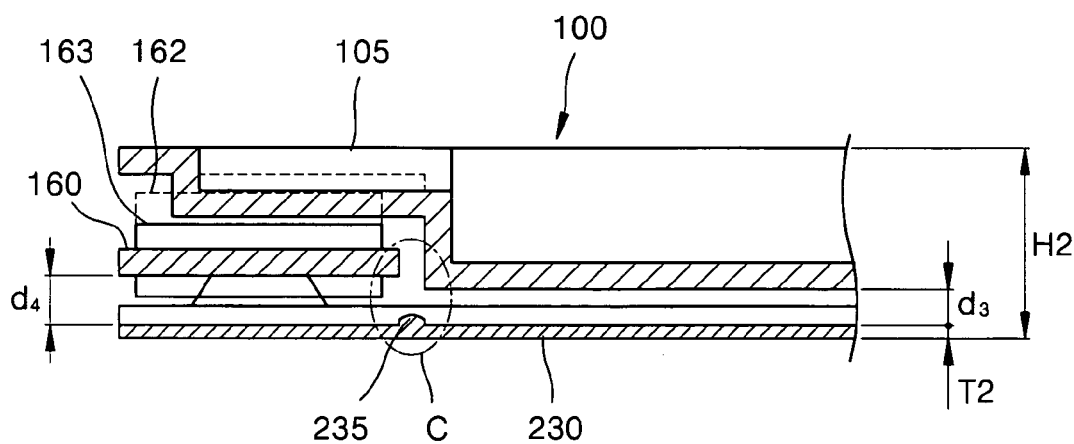
FIG. 5 is a sectional view taken along line III–III' of FIG. 2.

Referring to FIG. 5, the main control board 160 is disposed under the tray 100 in a state in which the tray 100 is loaded. A step 105 is formed on the tray 100 corresponding to the height of the main control board 160 so as not to interfere with the main control board 160. The lower surface of the tray 100 maintains an interval d3 not to interfere with the upper surface of the third frame 230. Reference numerals 162 and 163 indicate the heights to which parts can be mounted on the upper surface of the main control board 160 at the center portion and the side edge portions thereof, respectively.

A beading line 235 protruding upward to reinforce the bending strength of the third frame may be formed on the third frame 230. The beading line 235 is formed within a range not to interfere with the tray 100 or limit a part mounting space under the main control board 160. As shown in FIG. 2, in the embodiment, the beading line 235 having an "H" shape is formed at a position separated inwardly from both side edges of the third frame 230 by using an interval "C" of FIG. 5 between the main control board 160 and the tray 100. Consequently, the bending strength of the third frame 230 can be improved while avoiding an interference with the tray 100 and the main control board 160.

The height of the slim optical disc drive having the above structure is described below.

Figure 6:
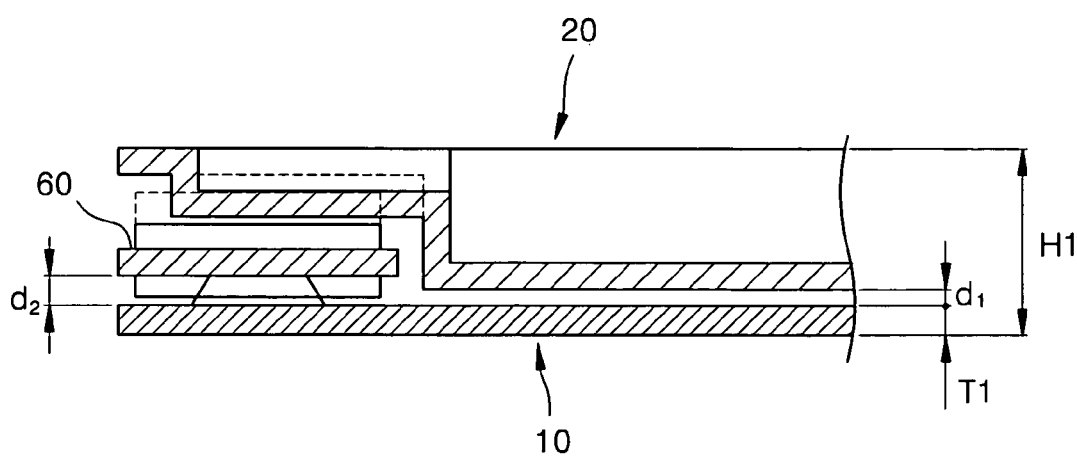
FIG. 6 is a sectional view taken along line IV–IV' of FIG. 1.

FIG. 6 is a sectional view taken along line IV–IV' of FIG. 1 showing the conventional slim optical disc drive. Referring to FIG. 6, the tray 20 slides with an interval d1 with respect to the lower case 10. Also, the interval between the lower surface of the main control board 60 and a lower case 10 is d2. The height from the lower surface of the lower case 10 to the upper surface of the tray 20 is H1.

Referring to FIG. 5, the tray 100 of the slim optical disc drive according to an embodiment of the present invention slides with the interval d3 with respect to the third frame 230 and the interval between the main control board 160 and the third frame 230 is d4. The height from the lower surface of the third frame 230 and the upper surface of the tray 100 is H2.

Referring to FIGS. 5 and 6 when H2 and H1 are the same, d3 and d4 are greater than d1 and d2, respectively, as much as a difference between the thickness T1 of the lower case 10 of FIG. 6 and the thickness T2 of the third frame 230 as shown in FIG. 5. Thus, when the intervals between the tray 100 and the third frame 230, and the main control board 160 and the third frame 230 in the slim optical disc drive according to an embodiment of the present invention become d1 and d2, respectively, the height may be reduced as much as the difference in comparison to the conventional slim optical disc drive. Therefore, the slim optical disc drive according to the present invention may be made as thin as the difference. For example, when the thickness T1 of the lower case 10 of FIG. 1 is 0.6 mm and the thickness T2 of the third frame 230 is 0.2 mm, the height can be reduced by 0.4 mm. Considering that a typical thickness of the slim optical disc drive is approximately 10 mm, the reduction in the height by 0.4 mm is very significant.

When the height of the slim optical disc drive according to the present invention is the same as that of the conventional slim optical disc drive, components which are thicker by T3 can be used. When the slim optical disc drive has a recording/reproduction function of a CD-RW or a DVD reproduction function in addition to a reproduction function of a CD-ROM, the optical pickup increases in the thickness and size so that the thickness of the slim optical disc drive increases as electrical components are mounted on the main control board, as described above.

In order to prevent an increase of the thickness in the structure like in the conventional slim optical disc drive, a method of forming a penetrating portion as indicated by a dotted line of FIG. 1 may be considered. In this case, however, the strength of the lower case supporting the tray is decreased, thereby weakening the stability of the optical disc drive. Also, since the FPC cannot be fixed, when the tray slides, the FPC may be caught or torn between the tray and the lower case.

In contrast, since the slim optical disc drive according to the present invention has an allowance of as much as T3 compared to the conventional slim optical disc drive assuming the same height, there is no need to form the penetrating portion in the lower case within the allowance. Thus, the strength of the lower case is not decreased and the FPC is not torn. Since the thickness of the third frame is thin, there may be partial lowering of strength. However, the lowering of the strength can be minimized by assembling the main control board across the first frame and the second frame or forming the beading lines.

As described above, the slim optical disc drive according to the present invention many advantages. Since the lower case having the third frame which is thin is used, the thickness of the product can be reduced. For multipurpose products, the increase in thickness can be prevented or minimized. Thus, the present invention meets the need to make an optical disc drive suitable for small and thin portable terminals, including notebook computers.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A slim optical disc drive comprising:
   a tray having a spindle motor which rotates an optical disc and an optical pickup which slides across the optical disc mounted on the tray;
   a lower case where the tray is slidably installed; and
   a main control board installed on the lower case to control operation of the optical disc drive,
   wherein the lower case comprises:
      a first frame which supports a first side of the tray,
      a second frame which supports a second side of the tray, and
      a third frame formed of a plate member which is narrower than the first frame and the second frame, to connect the first frame and the second frame and fixedly disposed under the main control board, the first frame and the second frame, wherein the third frame is positioned underneath the tray at a predetermined distance, when the tray is slid into the lower case.

2. The slim optical disc drive of claim 1, wherein the main control board is coupled to each of the first frame and the second frame.

3. The slim optical disc drive of claim 1, further comprising a flexible printed circuit which is flexibly bent as the tray slides and electrically connects the tray and the main control board, wherein a portion of the flexible printed circuit is fixed to the third frame.

4. The slim optical disc drive of claim 3, wherein the flexible printed circuit comprises a first connection portion which connects the flexible printed circuit to the tray of the optical disc drive and a second connection portion which connects the flexible printed circuit to the main control board.

5. The slim optical disc drive of claim 4, wherein the first connection portion and the second connection portion are formed on end portions of the flexible printed circuit.

6. The slim optical disc drive of claim 3, wherein the flexible printed circuit is U-shaped and has a first connection portion and a second connection portion formed on end portions of the flexible printed circuit.

7. The slim optical disc drive of claim 1, further comprising a beading line protruding upward and formed on the third frame to improve a bending strength.

8. The slim optical disc drive of claim 1, wherein a plurality of reference holes are formed in the first frame and the second frame and a plurality of protruding portions coupled to the reference holes are formed on the third frame.

9. The slim optical disc drive of claim 1, further comprising a step formed on the tray, which corresponds to the height of the main control board to keep the tray from interfering with the main control board.

10. The slim optical disc drive of claim 1, wherein a plurality of reference holes are formed on the third frame and a plurality of protruding portions coupled to the reference holes are formed on the first and the second frames.

11. A slim optical disc drive comprising:
   a tray having a spindle motor which rotates an optical disc and an optical pickup which slides across the optical disc mounted on the tray;
   a lower case where the tray is slidably installed;
   a main control board installed on the lower case to control operation of the optical disc drive,
   wherein the lower case comprises:
      a first frame which supports a first side of the tray,
      a second frame which supports a second side of the tray, and
      a third frame formed of a plate member which is narrower than the first frame and the second frame, to connect the first frame and the second frame and disposed under the tray and the main control board; and
   a step formed on the tray, which corresponds to the height of the main control board to keep the tray from interfering with the main control board and an interval between a bottom surface of the tray and an upper surface of the third frame which is greater than a thickness of the third frame and an interval between a bottom surface of the main control board and the upper surface of the third frame which is greater than the thickness of the third frame.

* * * * *